US008289178B2

(12) United States Patent
Slemon et al.

(10) Patent No.: US 8,289,178 B2
(45) Date of Patent: Oct. 16, 2012

(54) ELECTRO/OPTICAL SMOKE ANALYZER

(75) Inventors: Michael S. Slemon, Encinitas, CA (US); Charles S. Slemon, Encinitas, CA (US)

(73) Assignee: Volution, Encinitas, CA (US)

( * ) Notice: Subject to any disclaimer, the term of this patent is extended or adjusted under 35 U.S.C. 154(b) by 299 days.

(21) Appl. No.: 12/689,051

(22) Filed: Jan. 18, 2010

(65) Prior Publication Data

US 2011/0175741 A1 Jul. 21, 2011

(51) Int. Cl.

| | |
|---|---|
| ***G08B 17/10*** | (2006.01) |
| ***H01J 3/14*** | (2006.01) |
| ***G01J 1/42*** | (2006.01) |
| ***G01N 21/00*** | (2006.01) |

(52) U.S. Cl. ........ 340/630; 340/628; 250/216; 250/573; 250/574; 250/575; 250/578.1; 356/222; 356/224; 356/229; 356/231; 356/234; 356/239.1; 356/239.2; 356/337; 356/438; 356/448

(58) Field of Classification Search .................. 340/630, 340/628; 250/216, 573, 574, 575, 578.1; 356/222, 224, 229, 231, 234, 239.1, 239.2, 356/337, 438, 442, 448; 73/107.06, 107.07
See application file for complete search history.

(56) References Cited

U.S. PATENT DOCUMENTS

| | | | | |
|---|---|---|---|---|
| 4,330,385 | A | 5/1982 | Arthur et al. | |
| 4,474,051 | A | 10/1984 | Fukuda et al. | |
| 4,764,344 | A | 8/1988 | Knab | |
| 5,239,483 | A | 8/1993 | Weir | |
| 5,291,607 | A | 3/1994 | Ristic et al. | |
| 5,400,641 | A | 3/1995 | Slemon et al. | |
| 5,576,697 | A * | 11/1996 | Nagashima et al. | 340/630 |
| 5,872,634 | A | 2/1999 | Kunz | |
| 5,910,765 | A | 6/1999 | Slemon et al. | |
| 6,218,950 | B1 * | 4/2001 | Politze et al. | 340/630 |
| 7,126,687 | B2 * | 10/2006 | Hill et al. | 356/336 |
| 7,233,253 | B2 | 6/2007 | Qualey, III | |
| 7,474,227 | B2 | 1/2009 | Qualey, III | |
| 7,508,313 | B2 * | 3/2009 | Cole | 340/628 |
| 8,085,157 | B2 * | 12/2011 | Luterotti | 340/628 |

* cited by examiner

*Primary Examiner* — Daniel Wu
*Assistant Examiner* — Mancil Littlejohn
(74) *Attorney, Agent, or Firm* — Nydegger & Associates

(57) ABSTRACT

A system for analyzing smoke has a plurality of units, wherein each unit includes an optical emitter for alternately directing horizontally and vertically polarized light along a beam path, and into a smoke cloud, to generate scattered light. A horizontally polarized detector and a vertically polarized detector are positioned at different locations, but at a same distance and scattering angle relative to the beam path. Each unit has a different wavelength. A computer receives signals from the detectors of all units, in response to each emitter, for analysis of the smoke.

16 Claims, 2 Drawing Sheets

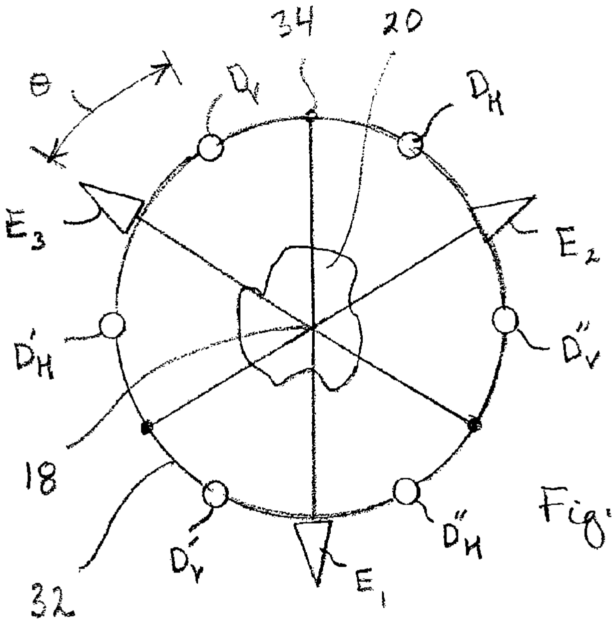

Fig. 3

| Detectors | Emitter 1 | Emitter 2 | Emitter 3 |
|---|---|---|---|
| | $\lambda_H$ $\lambda_V$ | $\lambda'_H$ $\lambda'_V$ | $\lambda''_H$ $\lambda''_V$ |
| | | | |
| $D_H$ | $S_{HH}$ $S_{VH}$ | $S_{H'H}$ $S_{V'H}$ | $S_{H''H}$ $S_{V''H}$ |
| | | | |
| $D_V$ | $S_{HV}$ $S_{VV}$ | $S_{H'V}$ $S_{V'V}$ | $S_{H''V}$ $S_{V''V}$ |
| | | | |
| $D'_H$ | $S_{HH'}$ $S_{VH'}$ | $S_{H'H'}$ $S_{V'H'}$ | $S_{H''H'}$ $S_{V''H'}$ |
| | | | |
| $D'_V$ | $S_{HV'}$ $S_{VV'}$ | $S_{H'V'}$ $S_{V'V'}$ | $S_{H''V'}$ $S_{V''V'}$ |
| | | | |
| $D''_H$ | $S_{HH''}$ $S_{VH''}$ | $S_{H'H''}$ $S_{V'H''}$ | $S_{H''H''}$ $S_{V''H''}$ |
| | | | |
| $D''_V$ | $S_{HV''}$ $S_{VV''}$ | $S_{H'V''}$ $S_{V'V''}$ | $S_{H''V''}$ $S_{V''V''}$ |
| | | | |
| | | | |
| | | | |

Fig. 4

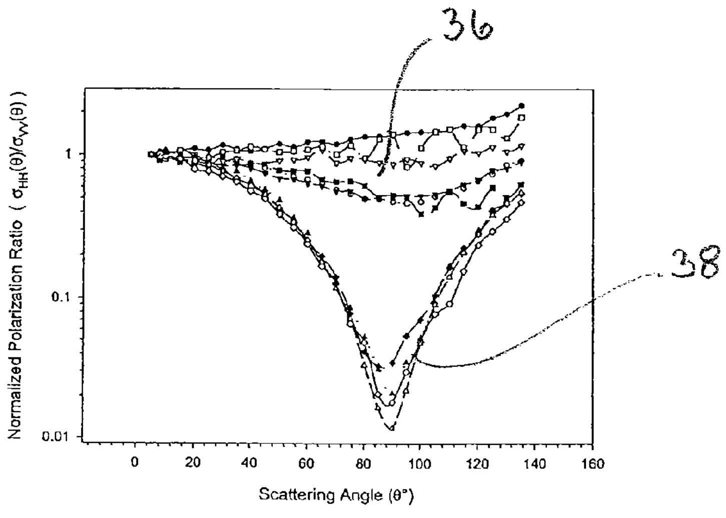

Fig. 5

ELECTRO/OPTICAL SMOKE ANALYZER

FIELD OF THE INVENTION

The present invention pertains generally to smoke analyzers. More particularly, the present invention pertains to optical devices that are used for smoke analyzers. The present invention is particularly, but not exclusively useful as an optical unit for generating signals to analyze smoke, wherein the signals are based on polarization, wavelength and scattering angle considerations.

BACKGROUND OF THE INVENTION

Particles of different sizes and shapes (i.e. different materials) can become suspended in air for any of several different reasons. Tiny, condensed water droplets or ice crystals that become suspended in the atmosphere as clouds are a good example of this phenomenon. Clouds of particles, other than water, that may become suspended in air, such as dust and smoke, are also well known examples of the phenomenon. Unfortunately, smoke can be generated with many types of materials that will most likely cause undesirable consequences. In any event, and particularly in the case of smoke, it may be desirable or necessary to identify the type(s) of particles that constitute the smoke cloud.

Physically, it is well known that different types of particles, when suspended in air as a cloud, will affect light differently. In particular, it is known that particles in a cloud will scatter the light that is incident on the cloud and, depending on the nature of the particles in the cloud, the incident light will be scattered in a predictable and detectable manner. Importantly, the measurable characteristics of the scattered light depend on at least three significant factors. For one, if the incident light is polarized, when it is incident on particles in a cloud the light may change its polarization. If so, the polarization of the scattered light will be different from that of the incident light. For another, the wavelength ($\lambda$) of the incident light that interacts with the particles in the cloud will determine the extent of scattering. Further, detection of the scattered light will be influenced by where the detector is located relative to the beam path of the incident light (i.e. a scattering angle ($\theta$)). In summary, the detection of a signal that is generated when light is scattered by a smoke cloud is dependent on the polarization of the incident light, the wavelength ($\lambda$) of the incident light, and the scattering angle ($\theta$) where the detector happens to be located.

For purposes of the present invention, the above factors are important because different smoke and dust particles will scatter a same incident light beam differently. Further, it can be shown that relatively benign particles, though detectably different, have characteristically similar responses. Accordingly, as a group, they can be differentiated from the group of responses that are characteristically different and are typical of potentially hazardous or toxic particles (e.g. petrochemicals).

In light of the above, it is an object of the present invention to provide an optical unit for a smoke analyzer system that evaluates signals received from light scattered by a smoke cloud to determine whether the smoke includes particularly hazardous or toxic materials. Another object of the present invention is to provide an optical unit for a smoke analyzer system that generates signals for evaluation, wherein the signals are based on polarization, wavelength and scattering angle considerations. Yet another object of the present invention is to provide an optical unit for a smoke analyzer that is easy to use, is simple to manufacture and is comparatively cost effective.

SUMMARY OF THE INVENTION

A system for analyzing smoke includes a plurality of optical units, wherein each unit includes an optical emitter (E) and a pair of detectors. Each emitter is computer controlled to alternately direct a beam of horizontally polarized light ($\lambda_H$), or a beam of vertically polarized light ($\lambda_V$) along a beam path through a smoke cloud. Further, the emitters of the different optical units are controlled by the computer for sequential operation.

In addition to its emitter, each optical unit includes a horizontally polarized detector ($D_H$) and a vertically polarized detector ($D_V$). Both detectors are positioned at different locations having a same distance and a same scattering angle ($\theta$) relative to the beam path. Preferably, the detectors are coplanar with the emitter and are therefore on directly opposite sides of the beam path. In operation, the horizontally polarized detector ($D_H$) generates a signal $S_{HH}$ in response to $\lambda_H$, and it generates a signal $S_{VH}$ in response to $\lambda_V$. Similarly, the vertically polarized detector ($D_V$) generates a signal $S_{HV}$ in response to $\lambda_H$, and it generates a signal $S_{VV}$ in response to $\lambda_V$.

For a preferred embodiment of the present invention, three coplanar optical units are used. Thus, respective emitters ($E_1$, $E_2$ and $E_3$) are positioned on a circumference of a circle, with a separation arc length of 4$\theta$ between adjacent emitters. Within this arrangement, the emitter ($E_1$) of a first optical unit generates $\lambda_H$ and $\lambda_V$ having a same first wavelength ($\lambda$), the emitter ($E_2$) of a second optical unit generates $\lambda'_H$ and $\lambda'_V$ having a same second wavelength ($\lambda'$), and the emitter ($E_3$) of a third unit generates $\lambda''_H$ and $\lambda''_V$ having a same third wavelength ($\lambda''$). Importantly, each emitter is sequentially and individually activated by the computer for a predetermined time interval to simultaneously generate response signals (S) in all detectors of the system.

The computer is also used for evaluating all of the response signals "S" for an analysis of the smoke. More specifically, this task is accomplished by computing a polarization ratio $\rho(\theta)$: wherein $$\rho(\theta)=\sigma_{HH}(\theta)/\sigma_{VV}(\theta)$$

with $\sigma_{HH}(\theta)$ and $\sigma_{VV}(\theta)$ each being a differential mass scattering cross section for horizontally polarized light and for vertically polarized light, respectively. In particular, for the present invention, the polarization ratio, $\rho(\theta)$, is used to identify smoke from a petrochemical (hydrocarbon) source.

In addition to the optical units mentioned above, the system of the present invention also includes filters for minimizing noise in the response signals. One filter is for removing white noise from the response signals (S), and the other is for operationally tracking the emitters. Specifically, a pre-filter is connected to each of detectors to filter a substantially d.c. component (white noise) from the outputs of the respective detectors. Additionally, the system has an oscillator that is controlled by the computer and is connected to each of the emitters. As used for the present invention, the oscillator establishes a blink rate (e.g. 3 Hz) for the transmission of light beams (e.g. $\lambda_H$ and $\lambda_V$) from the respective emitters. Also, a synchronous demodulator is connected directly to the oscillator, and in series with the prefilter, for tracking the blink rate of the emitter during generation of the response signals S.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 3 is a schematic drawing of a plurality of optical units positioned for mutual operation as a system in accordance with the present invention;

FIG. 4 is a Table showing signals that are generated by the cooperative operations of light beam emitters and signal detectors for a system as shown in FIG. 3; and FIG. 5 is a graph of signal responses showing an exemplary difference between the optical responses of benign materials and those of hazardous materials.

DESCRIPTION OF THE PREFERRED EMBODIMENTS

Figure 1:
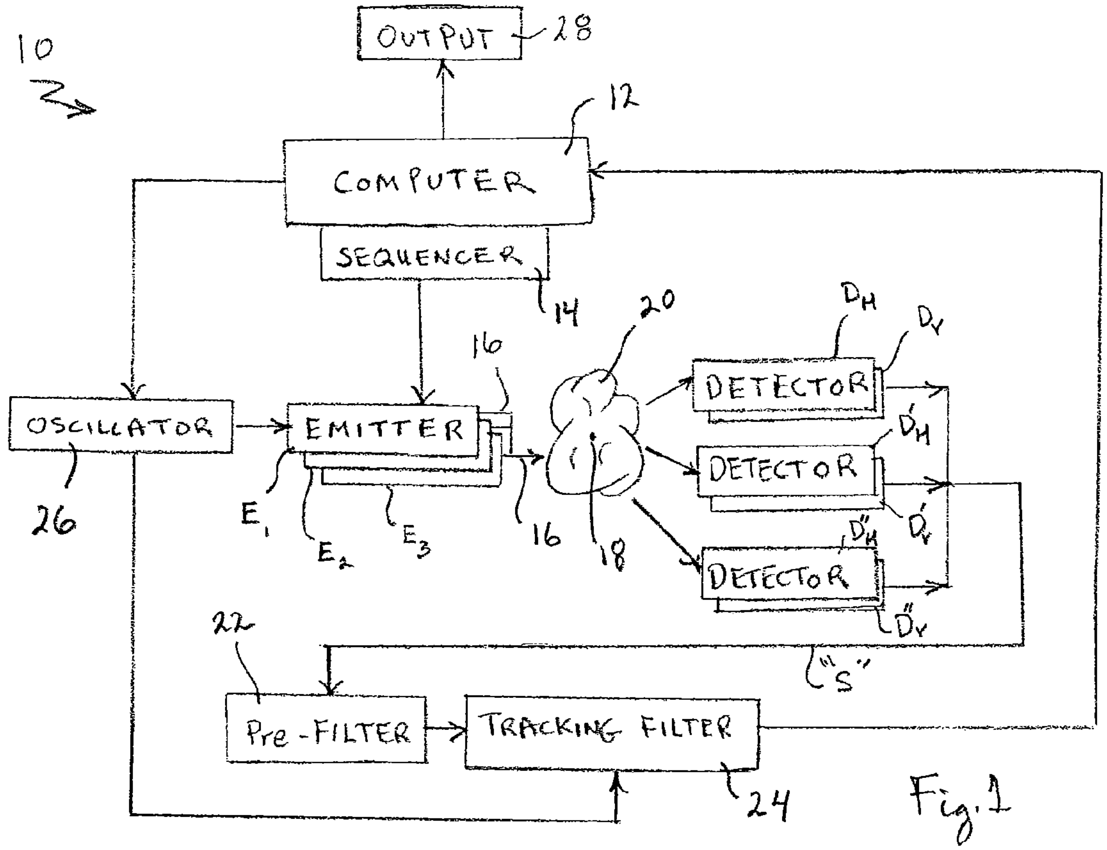
FIG. 1 is a schematic drawing of a system for an optical smoke analyzer in accordance with the present invention.

Referring initially to FIG. 1, a system for an optical smoke detector in accordance with the present invention is shown and is generally designated 10. As shown the system 10 includes a computer 12 that is directly connected with a sequencer 14. In turn, the sequencer 14 is connected to a plurality of emitters, of which the emitters $E_1$, $E_2$ and $E_3$ are exemplary. As intended for the system 10, each of the emitters E are positioned to direct a laser beam 16 to a point 18 in a smoke cloud 20. The light in the laser beam 16 will then be scattered as it passes through the smoke cloud 20, and will be received by a plurality of detectors, of which the detectors $D_H$, $D_V$, $D'_H$, $D'_V$, $D''_H$, and $D''_V$ are exemplary. FIG. 1 also shows that these detectors ($D_H$, $D_V$, $D'_H$, $D'_V$, $D''_H$, and $D''_V$) are each connected, in sequence, to a pre-filter 22 and a tracking filter 24. Further, the system 10 is shown to include an oscillator 26 that is connected between the computer 12 and each of the emitters $E_1$, $E_2$ and $E_3$, with the oscillator 26 also connected to the tracking filter 24.

In detail, each of the emitters $E_1$, $E_2$ and $E_3$ includes two light emitting diodes (LEDs) that are specifically interrelated to each other. Importantly, the laser light beams 16 that are emitted from the LEDs of a respective emitter $E_1$, $E_2$ and $E_3$ have a same wavelength (λ). They have, however, a different polarization. Specifically, the emitter $E_1$ will alternately transmit a horizontally polarized light beam 16 of wavelength $\lambda_H$, and a vertically polarized light beam 16 of wavelength $\lambda_V$. Similarly, the emitter $E_2$ will transmit light beams 16 of wavelengths $\lambda'_H$ and $\lambda'_V$, while the emitter $E_3$ will transmit light beams 16 of wavelengths $\lambda''_H$ and $\lambda''_V$. Preferably, λ is substantially red light, λ' is substantially green light, and λ" is substantially blue light. As envisioned for the present invention, the transmission of light beams 16 from the respective emitters $E_1$, $E_2$ and $E_3$ is controlled by the computer 12 through a concerted action of the sequencer 14 and the oscillator 26 to create signals S for use by computer 12 for generating an output 28.

Figure 2:
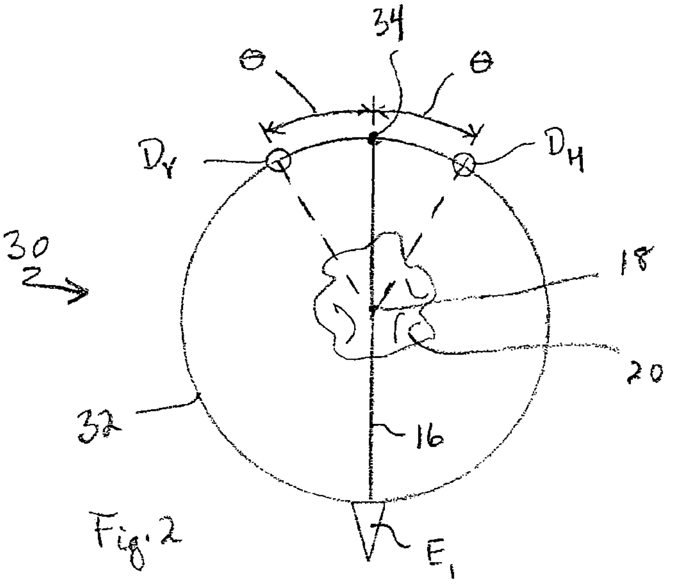
FIG. 2 is a schematic drawing of an optical unit for use with the system of the present invention.

Within the system 10, the operational positioning and orientation of the emitters $E_1$, $E_2$ and $E_3$, relative to the detectors $D_H$, $D_V$, $D'_H$, $D'_V$, $D''_H$, and $D''_V$ will perhaps be best appreciated with reference to the optical unit shown in FIG. 2 and generally designated 30. For the optical unit 30, it will be seen that a single emitter (e.g. $E_1$), and its associated detectors (i.e. $D_H$ and $D_V$), are positioned on the circumference of a circle 32. As shown, the circle 32 is centered on the point 18 in smoke cloud 20. And, the laser light beam 16 (in this case, λ) is directed from the emitter $E_1$, and through the point 18, to a reference detector 34. This reference detector 34 may be polarized or unpolarized. In order to properly orient the optical unit 30, the reference detector 34 is positioned on the circle 32 diametrically opposite the emitter $E_1$. As shown, the detectors $D_H$ and $D_V$ are then positioned opposite the path of light beam 16 from each other. And, they are respectively distanced from the reference detector 34 by a same arc length θ. As intended for the system 10, which preferably includes three optical units 30, the arc length θ will be equal to thirty degrees (30°).

A preferred layout of three optical units 30 for the system 10 is presented in FIG. 3. With reference to FIG. 3 it is to be appreciated that for this configuration of the system 10, the arc distance θ along the circumference of circle 32 will be the same from each detector D to an adjacent emitter E or to an adjacent reference detector (e.g. reference detector 34). This will then establish an arc distance of 4θ (i.e. 120°) between any two of the emitters $E_1$, $E_2$ and $E_3$. Further, it is also to be appreciated that as each of the emitters $E_1$, $E_2$ and $E_3$ are activated, signals "S" will be simultaneously generated at all of the detectors $D_H$, $D_V$, $D'_H$, D'v, $D''_H$, and $D''_V$ in the system 10.

By cross referencing FIG. 3 with FIG. 4, the signal generation capability of the system 10 will be appreciated. As already disclosed, each emitter E in the system 10 is capable of transmitting a specific wavelength light with different polarizations (i.e. emitter $E_1$ transmits $\lambda_H$ and $\lambda_V$, $E_2$ transmits $\lambda'_H$ and $\lambda'_V$; and $E_3$ transmits $\lambda''_H$ and $\lambda''_V$). In the Table of FIG. 4 the signals S are subscripted $S_{(emitter)(detector)}$. This is done by identifying the polarization (H or V) of light transmitted by the emitter, as well as the polarization (H or V) of the particular detector $D_H$, $D_V$, $D'_H$, $D'_V$, $D''_H$, or $D''_V$ that generates the signal in response to light transmitted from the emitter E. [Note: primes are provided depending on wavelength or optical unit 30 association]. For example, when emitter $E_2$ activates its horizontally polarized light beam 16 (i.e. $\lambda'_H$), the signals $S_{(emitter)(detector)}$ that are generated by detectors $D_H$, $D_V$, $D'_H$, $D'_V$, $D''_H$, and $D''_V$ are respectively, $S_{H'H}$, $S_{H'V}$, $S_{H'H'}$, $S_{H'V'}$, $S_{H'H''}$ and $S_{H'V''}$.

In the operation of the system 10, the computer 12 uses the sequencer 14 to sequentially activate the LEDs of emitters $E_1$, $E_2$ and $E_3$. In concert with its operation of the sequencer 14, computer 12 also uses the oscillator 26 to establish a so-called "blink rate" for the transmission of light beams 16 from the emitters $E_1$, $E_2$ and $E_3$. Accordingly, a sequence of light beams 16 having wavelengths and polarizations $\lambda_H$, $\lambda_V$, $\lambda'_H$, $\lambda'_V$, $\lambda''_H$, and $\lambda''_V$ are sequentially transmitted through the smoke cloud 20, at the established "blink rate". Consequently, for each sequence of light beams 16, all of the signals S shown in FIG. 4 are generated.

An important aspect of the system 10 is the combined use of the pre-filter 22 and the tracking filter 24. In detail, the pre-filter 22 is used to eliminate the substantially d.c. component of background signals from the signals S. On the other hand, the tracking filter 24 is driven at the established "blink rate" to effectively isolate the received signals S. The isolated signals S can then be identified to correspond with times when a light beam 16 is being transmitted from an emitter E.

In accordance with the operation of system 10, after they have been generated and filtered, all of the signals S (see FIG. 4) are transferred to the computer 12. The computer 12 then uses the signals S to calculate normalized polarization ratios, ρ(θ). Specifically, as used for the present invention a polarization ratio is calculated according to the expression:

$$\rho(\theta)=\sigma_{HH}(\theta)/\sigma_{VV}(\theta)$$

wherein $\sigma_{HH}(\theta)$ and $\sigma_{VV}(\theta)$ are, respectively, a differential mass scattering cross section for horizontally polarized light, and a differential mass scattering cross section for vertically polarized light. As used by the system 10 of the present invention, the polarization ratio, ρ(θ), can then help identify smoke from a petrochemical (hydrocarbon) source. In particular, a succession of these normalization ratios are calculated and compared with empirical data to classify the origin of the smoke cloud 20. As shown in FIG. 5 this classification will provide an output 28 to determine whether particles in the smoke cloud 20 are in a group 36 of typically benign elements, or are in a group 38 of typically toxic elements (e.g. petrochemicals).

While the particular Electro/Optical Smoke Analyzer as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An optical unit for a smoke analyzer system which comprises:

an optical emitter (E) for alternately directing a beam of horizontally polarized light ($\lambda_H$), and a beam of vertically polarized light ($\lambda_V$) along a beam path through a smoke cloud;

a horizontally polarized detector ($D_H$) positioned at a scattering angle (θ) from the beam path for generating a signal $S_{HH}$ in response to $\lambda_H$, and for generating a signal $S_{VH}$ in response to $\lambda_V$;

a vertically polarized detector ($D_V$) positioned at the scattering angle (θ) opposite the beam path from $D_H$ for generating a signal $S_{HV}$ in response to $\lambda_H$, and for generating a signal $S_{VV}$ in response to $\lambda_V$;

an oscillator connected to the emitter to establish a blink rate for transmissions of $\lambda_H$ and $\lambda_V$ from the emitter;

a pre-filter connected to the detector $D_V$ and to the detector $D_H$ to filter noise from outputs of the respective detectors $D_V$ and $D_H$, wherein the pre-filter filters a substantially d.c. component (white noise) from the outputs of the respective detectors $D_V$ and $D_H$;

a synchronous demodulator connected in series with the pre-filter and connected directly to the oscillator for tracking the blink rate of the emitter during generation of the signals $S_{HH}$, $S_{HV}$, $S_{VH}$, and $S_{VV}$; and a computer for evaluating the signals $S_{HH}$, $S_{HV}$, $S_{VH}$, and $S_{VV}$ for analysis of the smoke.

2. A system as recited in claim 1 further comprising three coplanar optical units with the respective emitters ($E_1$, $E_2$ and $E_3$) being positioned on a circumference of a circle, with a separation arc length of 4θ between adjacent emitters.

3. A system as recited in claim 2 wherein each emitter is individually activated for a predetermined time interval, in sequence, to simultaneously generate response signals (S) in all detectors of the system.

4. A system as recited in claim 3 wherein the emitter of a first optical unit generates $\lambda_H$ and $\lambda_V$ having a same first wavelength (λ), wherein the emitter of a second optical unit generates $\lambda'_H$ and $\lambda'_V$ having a same second wavelength (λ'), and wherein the emitter of a third unit generates $\lambda''_H$ and $\lambda''_V$ having a same third wavelength (λ").

5. A system as recited in claim 4 wherein λ is substantially red light, wherein is substantially green light and λ" is substantially blue light.

6. A system as recited in claim 1 wherein the collective signals (S) from the detectors are used to compute a polarization ratio, ρ(θ), wherein $$\rho(\theta)=\sigma_{HH}(\theta)/\sigma_{VV}(\theta)$$

with $\sigma_{HH}(\theta)$ and $\sigma_{VV}(\theta)$ respectively being a differential mass scattering cross section for horizontally polarized light and for vertically polarized light, and wherein the polarization ratio, ρ(θ), is used to identify smoke from a petrochemical (hydrocarbon) source.

7. A system as recited in claim 1 wherein the emitter comprises a first LED for generating $\lambda_H$ and a second LED for generating $\lambda_V$.

8. A system for analyzing smoke which comprises:

an emitter for directing polarized light along a beam path, wherein the emitter is positioned on a circumference of a circle and the beam path is directed along a diameter of the circle, and further wherein the light is near monochromatic and has a wavelength (λ);

a plurality of respectively polarized detectors positioned at predetermined locations on the circumference of the circle to generate signals (S) in response to light from the emitter and wherein the circumference is divided into twelve sectors of an equal arc length (θ=30°), with detectors positioned on opposite sides of the beam path at locations of θ, 3θ and 5θ arc lengths from the emitter; and a computer for evaluating the signals (S) for analysis of the smoke.

9. A system as recited in claim 8 wherein the emitter is a first emitter and the system further comprises:

a second emitter positioned at a location on the circumference of arc length 4θ from the first emitter to direct polarized light along a diametric beam path, wherein the light from the second emitter has a wavelength λ'; and a third emitter positioned at a location on the circumference of arc length 4θ from the first emitter, wherein the third emitter is opposite the beam path of the first emitter from the second emitter, and wherein the third emitter directs polarized light of wavelength λ" along a diametric beam path.

10. A system as recited in claim 9 wherein each emitter alternately directs a beam of horizontally polarized light ($\lambda_H$) and a beam of vertically polarized light ($\lambda_V$) along its beam path through the smoke cloud.

11. A system as recited in claim 10 wherein each emitter is individually activated for a predetermined time interval, in sequence, to simultaneously generate response signals (S) in all detectors of the system.

12. A system as recited in claim 10 wherein each emitter comprises a first LED for respectively generating $\lambda_H$, $\lambda'_H$, and $\lambda''_H$, and a second LED for respectively generating $\lambda_V$, $\lambda'_V$, and $\lambda''_V$.

13. A system as recited in claim 10 wherein the collective signals (S) from the detectors are used to compute a polarization ratio, ρ(θ), wherein $$\rho(\theta)=\sigma_{HH}(\theta)/\sigma_{VV}(\theta)$$

with $\sigma_{HH}(\theta)$ and $\sigma_{VV}(\theta)$ respectively being a differential mass scattering cross section for horizontally polarized light and for vertically polarized light, and wherein the polarization ratio, ρ(θ), is used to identify smoke from a petrochemical (hydrocarbon) source.

14. A system as recited in claim 10 wherein λ is substantially red light, wherein λ' is substantially green light and λ" is substantially blue light.

15. A system as recited in claim 8 further comprising:

an oscillator connected to the emitter to establish a blink rate for transmissions of $\lambda_H$ and $\lambda_V$ from the emitter;

a pre-filter connected to the detector $D_V$ and to the detector $D_H$ to filter noise from outputs of the respective detectors $D_V$ and $D_H$; and a synchronous demodulator connected in series with the pre-filter and connected directly to the oscillator for tracking the blink rate of the emitter during generation of the signals (S).

16. A method for using a system to analyze smoke which comprises the steps of:

establishing the system by positioning three emitters and six detectors on a circumference of a circle divided into twelve equal sectors, each of arc length θ, wherein the first emitter is positioned to alternately direct a beam of horizontally polarized light of wavelength $\lambda_H$ and a beam of vertically polarized light of wavelength $\lambda_V$ along a diametric beam path through a smoke cloud inside the circle, and a second emitter positioned at a location on the circumference at an arc length 4θ from the first emitter to alternately direct polarized light of wavelength $\lambda'_H$ and $\lambda'_V$ along a diametric beam path, and a third emitter positioned at a location on the circumference at an arc length 4θ from the first emitter, wherein the third emitter is opposite the beam path of the first emitter from the second emitter, and wherein the third emitter alternately directs polarized light of wavelength $\lambda''_H$ and $\lambda''_V$ along a diametric beam path, and further wherein horizontally polarized detectors and vertically polarized detectors are selectively positioned on opposite sides of the beam path at locations of θ, 3θ and 5θ arc lengths from the first emitter;

individually activating each emitter for a predetermined time interval, in sequence, to simultaneously generate response signals (S) in all detectors of the system;

computing a polarization ratio, ρ(θ), wherein $$\rho(\theta)=\sigma_{HH}(\theta)/\sigma_{VV}(\theta)$$

with $\sigma_{HH}(\theta)$ and $\sigma_{VV}(\theta)$ respectively being a differential mass scattering cross section for horizontally polarized light and for vertically polarized light; and using the polarization ratio, ρ(θ), to identify smoke from a petrochemical (hydrocarbon) source.

* * * * *

UNITED STATES PATENT AND TRADEMARK OFFICE

CERTIFICATE OF CORRECTION

PATENT NO. : 8,289,178 B2
APPLICATION NO. : 12/689051
DATED : October 16, 2012
INVENTOR(S) : Michael S. Slemon and Charles S. Slemon It is certified that error appears in the above-identified patent and that said Letters Patent is hereby corrected as shown below:

Column 5, Line 64
Before the word “wherein” and after the word “is”
INSERT
-- λ' --

Signed and Sealed this
Fifteenth Day of January, 2013

David J. Kappos

David J. Kappos
*Director of the United States Patent and Trademark Office*